(12) United States Patent
Heli et al.

(10) Patent No.: US 10,550,856 B2
(45) Date of Patent: Feb. 4, 2020

(54) SUCTION NOZZLE AND BLOW-OUT UNIT OF A FAN

(71) Applicant: ebm-papst Mulfingen GmbH & Co.KG, Mulfingen (DE)

(72) Inventors: Thomas Heli, Langenburg (DE); Peter Riegler, Boxberg (DE); Valerius Schaaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 173 days.

(21) Appl. No.: 15/711,104

(22) Filed: Sep. 21, 2017

(65) Prior Publication Data

US 2018/0087535 A1 Mar. 29, 2018

(30) Foreign Application Priority Data

Sep. 28, 2016 (DE) .......... 10 2016 118 369

(51) Int. Cl.
| | |
|---|---|
| *F04D 29/70* | (2006.01) |
| *F04D 29/42* | (2006.01) |
| *G01F 5/00* | (2006.01) |
| *F04D 27/00* | (2006.01) |
| *F04D 19/00* | (2006.01) |

(52) U.S. Cl.
CPC ......... *F04D 29/703* (2013.01); *F04D 19/002* (2013.01); *F04D 27/001* (2013.01); *F04D 29/4226* (2013.01); *F04D 29/4253* (2013.01); *G01F 5/00* (2013.01)

(58) Field of Classification Search
CPC .. F04D 19/002; F04D 29/4253; F04D 27/001; G01F 1/05; G01F 15/00
See application file for complete search history.

(56) References Cited

U.S. PATENT DOCUMENTS

| | | | | |
|---|---|---|---|---|
| 5,426,975 | A * | 6/1995 | Stark | F04D 27/00 73/202 |
| 6,241,463 | B1 * | 6/2001 | Bahner | F04D 27/001 415/17 |
| 7,195,449 | B2 * | 3/2007 | Eisenhauer | F04D 27/00 415/118 |
| 9,120,043 | B2 * | 9/2015 | Johansson | B01D 46/444 |

(Continued)

FOREIGN PATENT DOCUMENTS

| | | | | |
|---|---|---|---|---|
| EP | 3048429 A1 * | 7/2016 | | F04D 17/16 |
| EP | 3048430 A1 * | 7/2016 | | F04D 17/16 |

*Primary Examiner* — Kevin R Steckbauer
(74) *Attorney, Agent, or Firm* — Scully Scott Murphy and Presser

(57) ABSTRACT

A suction nozzle is provided for a fan with a suction opening for suctioning a fan main flow. The suction nozzle has an opening edge section adjoining the suction opening and having a local outbreak. A flow insert is detachably provided in the local outbreak of the opening edge section. The flow insert forms a bypass leading to the suction opening for a bypass flow leading to the fan main flow. Measuring means are provided in the bypass for the volume flow determination of the fan main flow. A confusor is provided in the bypass. The confusor is formed by a first web and a second web. The first web and the second web circumferentially face one another to form a nozzle channel in the bypass. The nozzle channel has a radially narrowest section. The measuring means are arranged in the radially narrowest section.

17 Claims, 7 Drawing Sheets

(56) References Cited

U.S. PATENT DOCUMENTS

| | | | |
|---|---|---|---|
| 9,861,774 B2* | 1/2018 | Fu | A61M 16/0066 |
| 10,286,167 B2* | 5/2019 | Bothma | G01F 1/0755 |
| 2006/0034680 A1* | 2/2006 | Eisenhauer | F04D 27/00 |
| | | | 415/118 |
| 2007/0277592 A1* | 12/2007 | Johansson | B01D 46/0086 |
| | | | 73/38 |
| 2012/0138058 A1* | 6/2012 | Fu | A61M 16/0066 |
| | | | 128/204.23 |
| 2018/0064894 A1* | 3/2018 | Fu | A61M 16/0066 |
| 2018/0172561 A1* | 6/2018 | Kocher | G01N 1/2202 |

\* cited by examiner

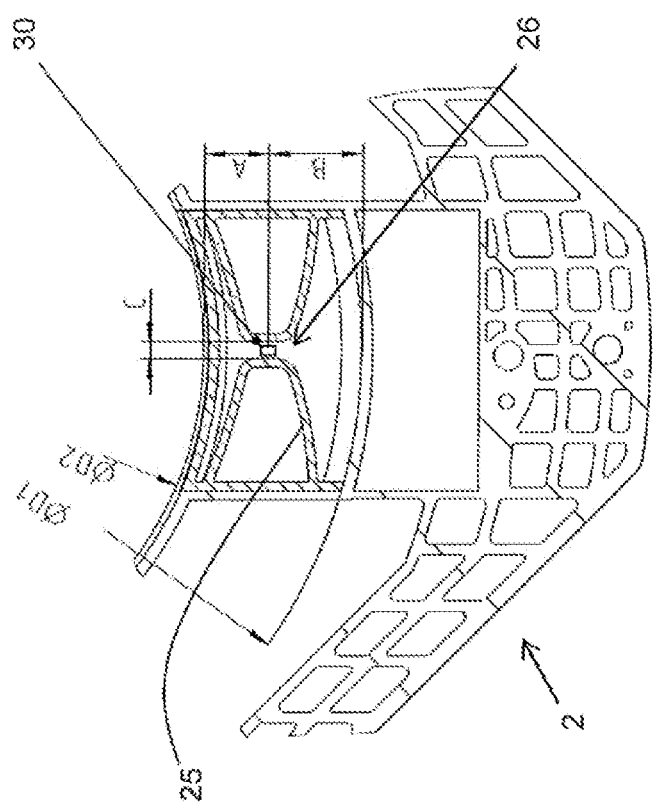

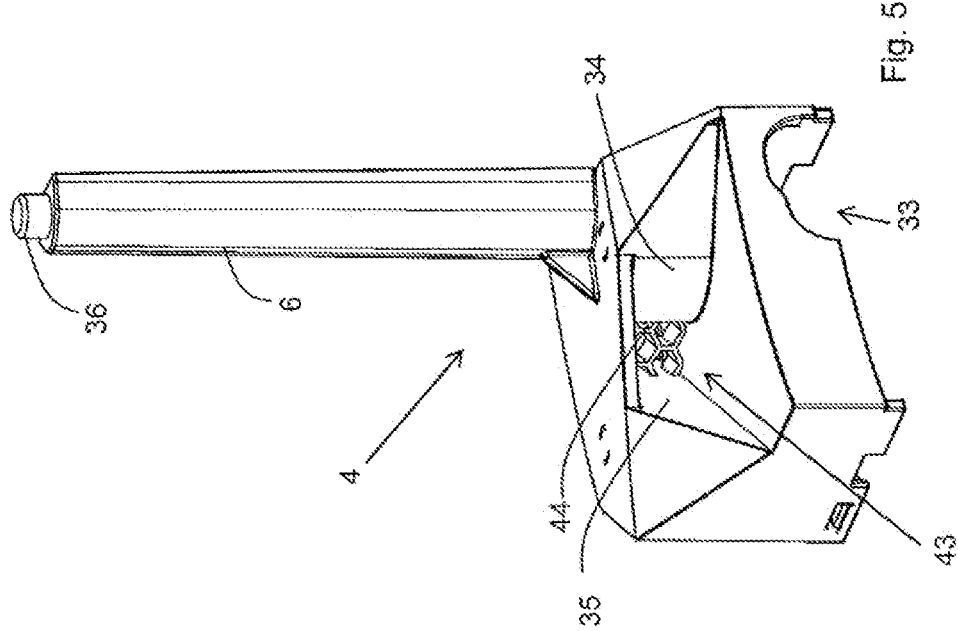

SUCTION NOZZLE AND BLOW-OUT UNIT OF A FAN

The invention relates to a suction nozzle and to a blow-out unit of a fan with integrated volume flow measurement as well as to the fan.

In many applications of air and air conditioning technology, it is necessary to determine and constantly adjust the conveyed volume flow of a blower or a fan. In addition, in such applications, the demands for the lowest possible fan noise are particularly high.

Conventionally, in air and air conditioning technology, cylindrical rotor fans are used, since they feature excellent noise characteristics even under disturbed flow feed conditions. In cylindrical rotor fans, the volume flow determination is possible due to a clear correlation between power consumption and volume flow at constant rotation speed. However, the relatively low level of efficiency in comparison to radial fans, in particular with impellers having blades which are bent backward, is disadvantageous.

Due to increased efficiency requirements, the cylindrical rotor fans are increasingly replaced by radial fans which optionally have blades which are bent backward. However, in such radial fans there is no clear correlation between power consumption and volume flow at constant rotation speed. Therefore, another method is necessary for the determination of the conveyed volume flow. A known solution consists in bleeding the static pressure in the inlet nozzle of the fan with the aid of a ring line. By means of this method, the volume flow can be determined directly from the measured static pressure. Typically, three or four pressure bleeding connections are linked via a ring line, and a pressure sensor is connected by means of a hose line. However, such a (hose) ring line causes a high installation effort and therefore high costs.

In addition, in the computation, it is disadvantageous that a nonlinear relationship exists between the conveyed volume flow and the effective pressure, as a result of which the measurement accuracy based on a measurement method with computation part is clearly worsened in the case of small volume flows.

The aim of the invention is to integrate a solution for a volume flow measurement on an existing fan, this solution having the lowest possible error- or tolerance-affected deviation even in the case of small volume flows.

This aim is achieved by the combination of features according to Claims 1, 10 as well as 20 and 21.

In principle, the invention is based on integrating the volume flow measurement in the suction nozzle or the blow-out unit of a fan, in particular of an axial fan. A volume flow measurement in both the suction nozzle and the blow-out unit is also possible, for example, in order to determine an average value or deviation value from the two measurement results.

According to the invention, a suction nozzle for a fan with a suction opening for the suctioning of a fan main flow is proposed. The suction nozzle comprises an opening edge section adjoining the suction opening and having at least one local outbreak in which a flow insert can be fastened detachably. The flow insert here forms a bypass leading to the suction opening for a bypass flow leading to the fan main flow. For the volume flow determination of the fan main flow, appropriate measuring means or sensors for the volume flow measurement are arranged in the bypass.

For the throughflow measurements, hot film manometry is used preferably, for which evaluation electronics as well as two sensors in the form of thermocouples are necessary. For example, as sensors, PT100 and PT1000 thermocouples measuring the environmental temperature are used, which are mounted on the surface of a board or of the circuit board in such a manner that they lie in the bypass flow. For example, the PT100 is mounted directly on the board, and the PT1000 is mounted as PTC with terminal clamps directly on the circuit board of the sensor, in order to position the resistors in a flow line of the bypass flow and thereby increase the measurement accuracy. Via the latching hooks, a positionally fixed fastening of the measuring means in the bypass is made possible.

In an advantageous design, the flow insert has a shape or outer contour which corresponds to a shape of the opening edge section adjoining the outbreak, so that the opening edge section is configured continuously with flow insert fastened thereto. This means that the opening edge section with the flow insert fastened in the outbreak is configured without interruption, as if no outbreak were provided. In the inserted state, the flow insert fills the outbreak completely.

In a development, the flow insert in the bypass comprises a confusor, via which the bypass flow is accelerated and bundled. The measuring means are arranged in the narrowest flow cross section of the confusor after an intake distance of the confusor, which corresponds to 3-5 times the width of the nozzle channel formed by the confusor. Thereby, an optimal incident flow of the measuring means or sensors can be implemented. In addition, by means of the confusor, an increase in the total speed of the bypass flow is achieved. This advantage is particularly relevant in operating areas of the fan in which only small rotation speeds are required or in which the fan is in startup phase. The increase in the flow speed in the confusor thus also ensures an increased incident flow speed of the measuring means or sensors in areas with low flow speed. Consequently, a valid measurement result is guaranteed for all the points of operation of the fan.

In an embodiment example, the confusor is configured to form a single piece on the flow insert. This solution is achieved, for example, in that the confusor is formed by webs which face one another and form a nozzle channel in the bypass. The shape and size of the webs can easily be adapted to match to the geometry of the flow insert and to ensure the desired nozzle shape of the confusor.

In an advantageous embodiment, for a positionally fixed fastening of the measuring means in the nozzle channel, the flow insert has latching elements, for example, latching hooks for clipping the flow element on the opening edge section of the suction nozzle.

For the formation of the bypass, in an advantageous embodiment of the suction nozzle, it is provided that the flow insert comprises an axial inlet opening extending on a radial outer edge of the flow insert, and an axial outlet opening extending on a radial inner edge of the flow insert, so that the bypass flow is axially suctioned and axially returned into the fan main flow. The inlet opening lies radially on the outer edge of the flow insert, and the outlet opening lies on the radial inner edge thereof, which forms a portion of the suction opening across the length of the outbreak.

In this section which adjoins or forms the suction opening, the flow insert comprises an intake section extending in axial direction, which the axial outlet opening adjoins. In other words, the intake section forms a contour which enables an axial feeding of the bypass flow into the fan main flow. The bypass itself extends along the opening edge section and, in particular, substantially vertically or vertically to the axial direction of the fan main flow. In the case of a round suction opening, the vertical course corresponds to the radial direction.

A positive geometric configuration exists in the suction nozzle if the outbreak and the flow insert extend over 10-30% of a total length of the edge of the suction opening. Usually, the suction opening of the suction nozzle of a fan is round, so that the outbreak and the flow insert extend preferably over 10-30% of the circumferential length of the suction opening.

The invention moreover includes the blow-out unit of the fan, which is configured for accommodating the impeller. The blow-out unit comprises a housing portion which, when used for the intended purpose, directly adjoins the impeller in flow direction and on which a fan main flow can be incident, and which forms a housing bypass for a bypass flow of the fan main flow. In the housing bypass, measuring means or a sensor for the volume flow determination of the fan main flow is arranged. The measuring means or sensors used correspond to those that have been described above.

The blowout-side volume flow measurement is further improved in a design variant in which the housing bypass comprises a housing confusor, and the measuring means for the volume flow measurement of the fan main flow are arranged in a narrowest flow cross section of the housing confusor. By means of the confusor, the bypass flow is accelerated and bundled.

In a design of the blow-out unit, the housing confusor is produced by webs which face one another and form a housing nozzle channel in the housing bypass. An inflow-side opening angle of the housing confusor formed by the webs is in a range of 90-110° in an advantageous design.

Furthermore, in an advantageous design, a flow rectifier for the bypass flow is arranged within the housing bypass upstream of the measuring means for the volume flow determination. The flow rectifier ensures conditioning and lamination of the flow, so that the vortexes, swirling effects and profile shifts forming due to the confusor and the turbulent blow-out field are eliminated. Thereby, a measurable improvement of the accuracy of the throughflow measurement at the fan is to be achieved.

With regard to the arrangement of the flow rectifier, in an advantageous design variant, it is provided that a distance E in flow direction between the flow rectifier and the measuring means in relation to a bypass width D in the area of the measuring means is set such that $0.5*D \leq E \leq 1.5*D$.

In an embodiment example, the flow rectifier is a honeycomb rectifier. Although said honeycomb rectifier has to be dimensioned to be longer in flow direction, it nevertheless also yields better rectifying effects.

In the case of the blow-out unit, in an embodiment variant, it is moreover provided that an intake distance F between the measuring means and an outermost outlet site of the bypass flow in relation to a bypass width D in the area of the measuring means is set such that $1.5*D \leq F \leq 2*D$. The straight intake distance B of the bypass flow within the housing portion to the flow rectifier is advantageously set in relation to a bypass width D in the area of the measuring means such that $3*D \leq B \leq 5*D$.

For the reduction of the components, the blow-out unit is advantageously characterized in that the housing portion is configured as cable accommodation for a connection cable of the fan, and the housing bypass is integrated in the cable accommodation. The cable accommodation, which in the technology can also be configured as cable protection strut with a condenser holder which can be integrated, is usually positioned in the position provided for the housing portion, close to the blow-out section of the impeller, and it is thus suitable as a housing portion forming the bypass.

The invention moreover comprises the entire fan with an above-described suction nozzle, with a blow-out unit and with an impeller arranged between the suction nozzle and the blow-out unit. The suction nozzle and the blow-out unit are connected via fastening legs and enclose the impeller which, during operation, generates the fan main flow as well as the bypass flow through the bypass of the suction nozzle.

In addition, the invention comprises the fan with a suction nozzle, with an above-described blow-out unit and with an impeller arranged between the suction nozzle and the blow-out unit. The suction unit and the blow-out unit are connected via fastening legs and enclose the impeller which, during operation, generates both the fan main flow and the bypass flow through the housing bypass of the housing portion of the blow-out unit.

In a third variant, the fan comprises both the above-described suction nozzle and also the above-described blow-out unit and therefore a redundant volume flow measurement.

All the features disclosed can be combined in any desired manner to the extent technically feasible and not contradictory. Other advantageous developments of the invention are characterized in the dependent claims or represented in further detail below together with a description of the preferred design of the invention in reference to the figures.

FIG. 3b shows a perspective view onto a lower side of the flow insert from FIG. 3a;

FIG. 4 shows a partial cross-sectional view of the suction nozzle from FIG. 2;

FIG. 5 shows a perspective view of a housing portion from FIG. 1;

FIG. 6b shows a cross-sectional view A-A from FIG. 6a;

In the figures, identical reference numerals always mark identical parts.

Figure 1:
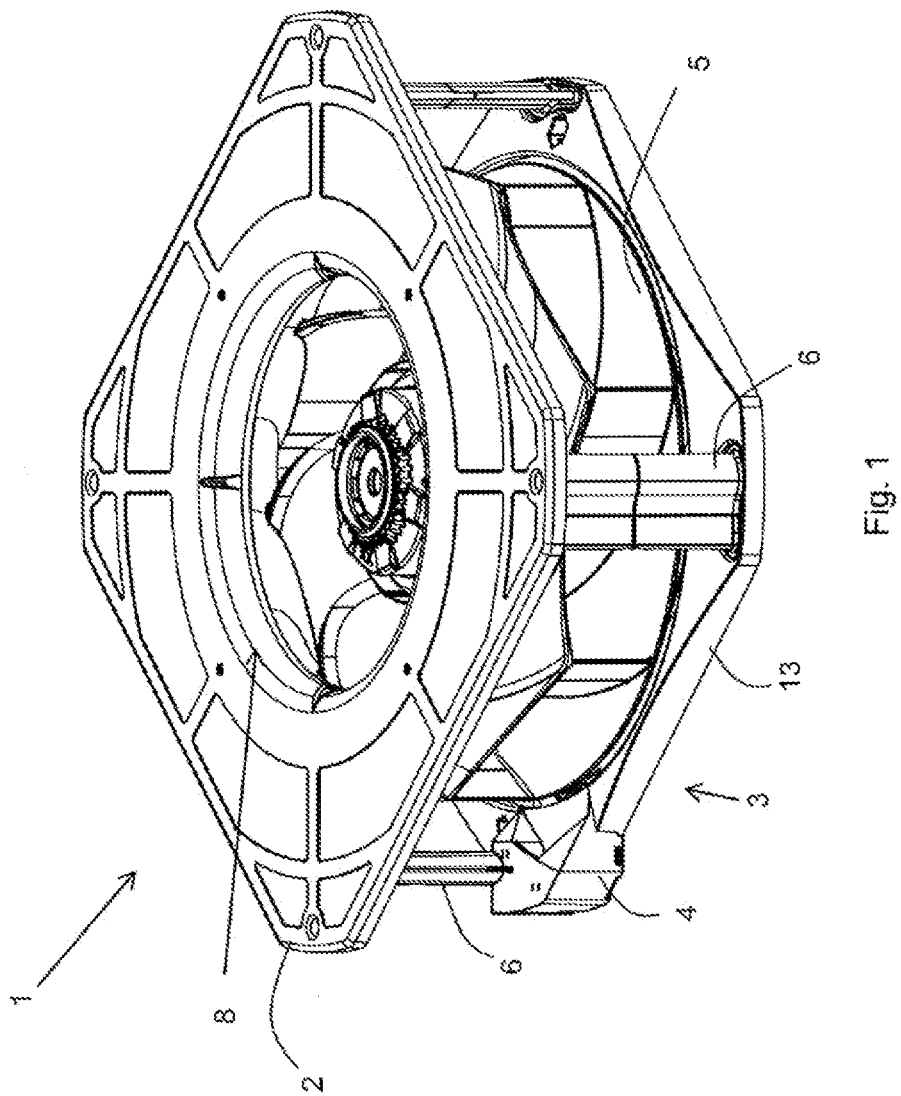
FIG. 1 shows a perspective general view of a fan.

In FIG. 1, the fan 1 is represented in a perspective view with a suction nozzle 2, with a blow-out unit 3 as well as with a motor-driven impeller 5 in between. The suction nozzle 2 is plate-shaped and, in the center, it has a round radially and axially recessed suction opening 8. The blow-out unit 3 is formed by a bottom plate 13 accommodating the impeller 5, with a housing portion 4 attached thereto, configured as a cable accommodation. The suction nozzle 2 and the blow-out unit 3 are connected by four legs 6 provided in the corners, so that the fan 1 represents a component. The legs 6 are formed partially on the suction nozzle 2 and partially on the bottom plate or on the housing portion 4 and engage in one another.

Figure 2:
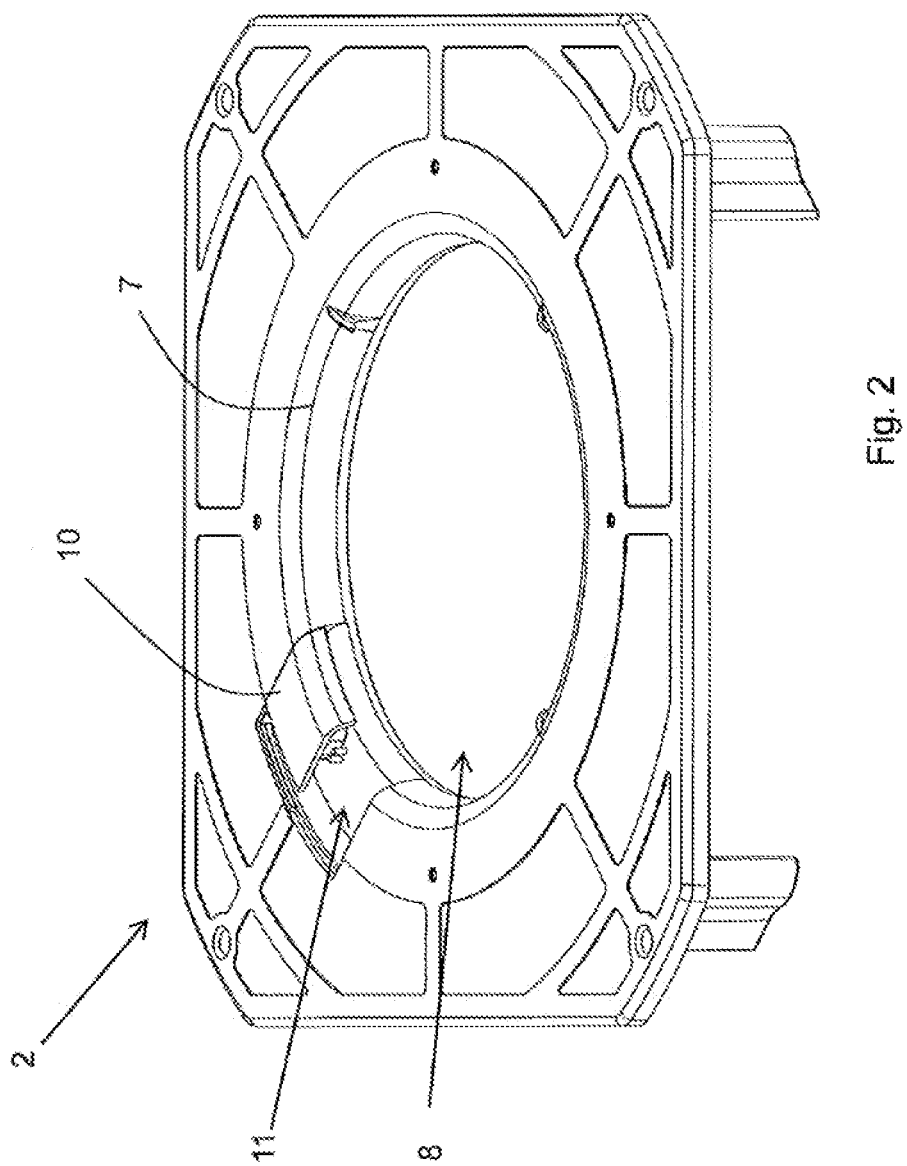
FIG. 2 shows a perspective view of a suction nozzle.

In FIG. 2, the suction nozzle 2 is represented separately and in greater detail. In particular, in FIG. 2, the opening edge section 7 adjoining or determining the suction opening 8 is shown with a local outbreak 11. In the area of the outbreak 11, the body of the suction nozzle 2 extends to the suction opening 8; however, a free space for the flow insert 10 is provided, which, in the inserted state, completely fills the outbreak 11 so that the opening edge section 7 extends continuously in circumferential direction and in radial direction. For this purpose, the flow insert 10 has a shape which corresponds to the shape of the opening edge section 7 adjoining the outbreak 11. The gap at the edge of the flow insert 10 is negligibly small in terms of flow technology. For the detachable fastening of the flow insert 10 in the outbreak 11, suitable clip-on or latching elements are provided.

Figure 3B:
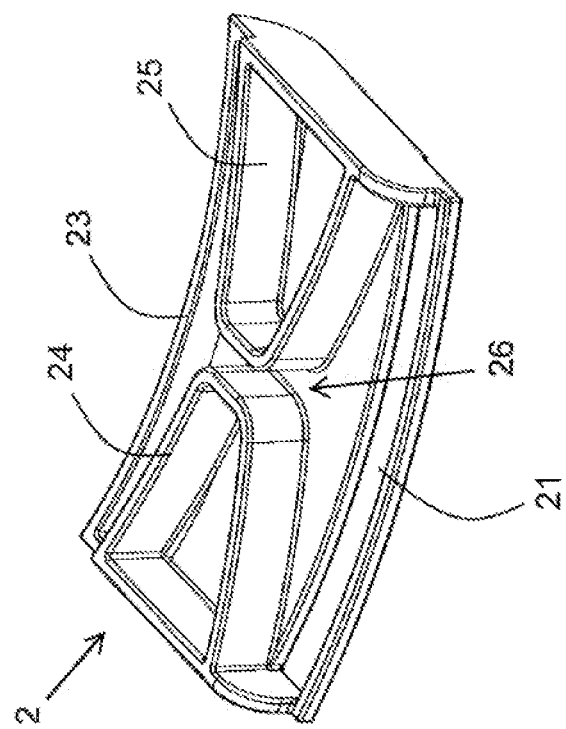
Figure 3A:
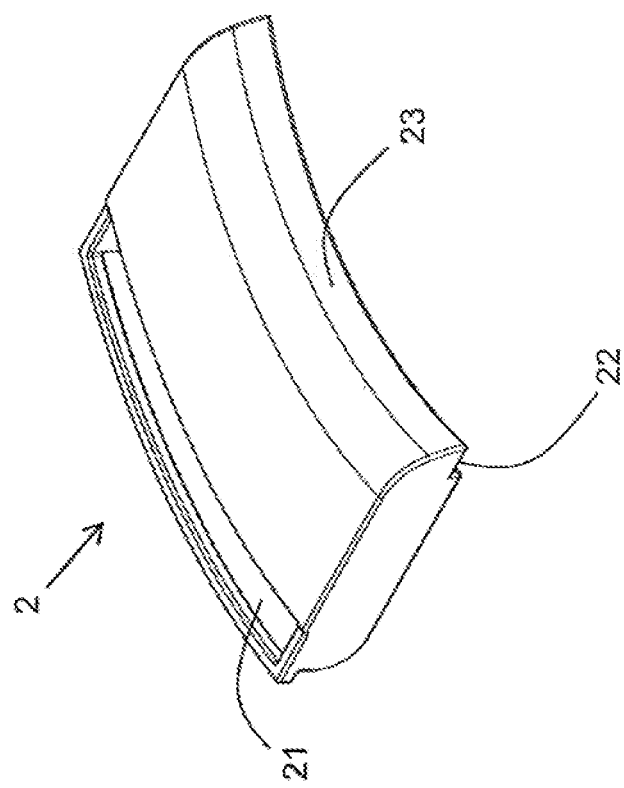
FIG. 3a shows a perspective view onto an upper side of a flow insert.

In reference to FIG. 3a, 3b, the flow insert 10 is represented in further detail from the two sides. The flow insert 10 comprises an axial inlet opening 21 extending on the radial outer edge thereof as well as an axial outlet opening 22 extending on the radial inner edge and in between it forms the bypass for the bypass flow. The bypass flow is suctioned axially, extends radially through the flow insert 10 and is returned via the outlet opening 22 oriented substantially axially into the fan main flow at the suction opening 8. On the flow insert 10, webs 24, 25 facing one another in the bypass are formed, which constitute a confusor with a nozzle channel 26 through which the bypass flow is pushed. The webs 24, 25 form a closed contour and thus guide the bypass flow exclusively through the nozzle channel 26.

As can be seen clearly in the partial cross-sectional view of the suction nozzle 2 in the area of the flow insert 10 according to FIG. 4, the nozzle channel 26 formed by the webs 24, 25 extends in a straight line radially outward. After an intake distance B starting at the inlet opening 21, the measuring means or the sensor 30 is arranged, wherein the intake distance B is three times as long as the nozzle channel width C. The discharge distance extending from the sensor 30 to the suction opening is twice as large as the nozzle width C. The nozzle channel has a constant nozzle channel width B in the area of the sensor 30. D2 denotes the diameter of the suction opening 8, and D1 denotes the diameter at the inlet opening 21.

FIG. 5 shows the housing portion 4 from FIG. 1, configured as a cable accommodation of the fan 1. The housing portion 4 forms the housing bypass for the bypass flow of the fan main flow in the blow-out unit 3, wherein, in the housing bypass, the measuring means or sensors for the volume flow determination of the fan main flow are arranged, as shown in greater detail in FIG. 7. On the housing portion 4, the leg 6 forms a single piece with the connection head 36, via which connection head the leg 6 is connected to the suction nozzle 2. In the lower section, the housing portion 4 has a recess 33 for the introduction of the fan connection cable (not shown). In addition, additional components, which are not represented, such as a condenser holder, can be arranged in the housing portion 4. In the upper section, in the housing portion 4, an in-blow opening 43 facing the impeller 5 is provided, which provides the inlet or the start of the housing bypass formed by the webs 34 and 35. In the in-blow opening, a honeycomb rectifier 44 for conditioning and laminating the in-blown air flow is integrated upstream with respect to the measuring means for the volume flow measurement.

Figure 6B:
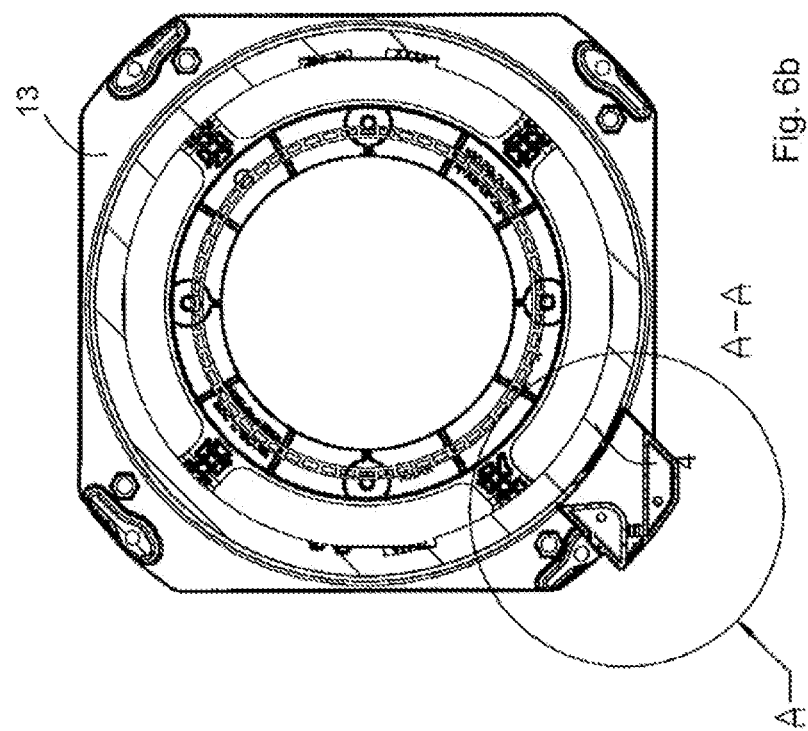
Figure 6A:
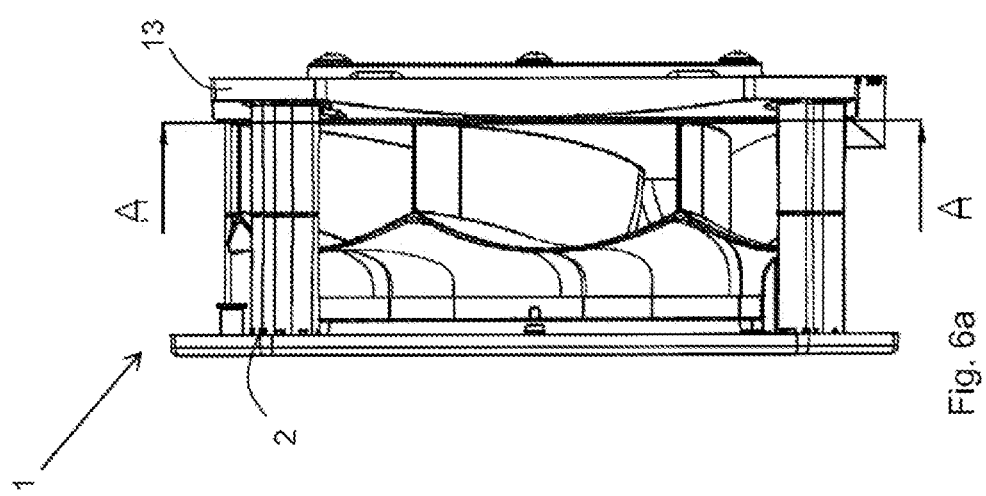
FIG. 6a shows a side view of the fan from FIG. 1.
Figure 7:
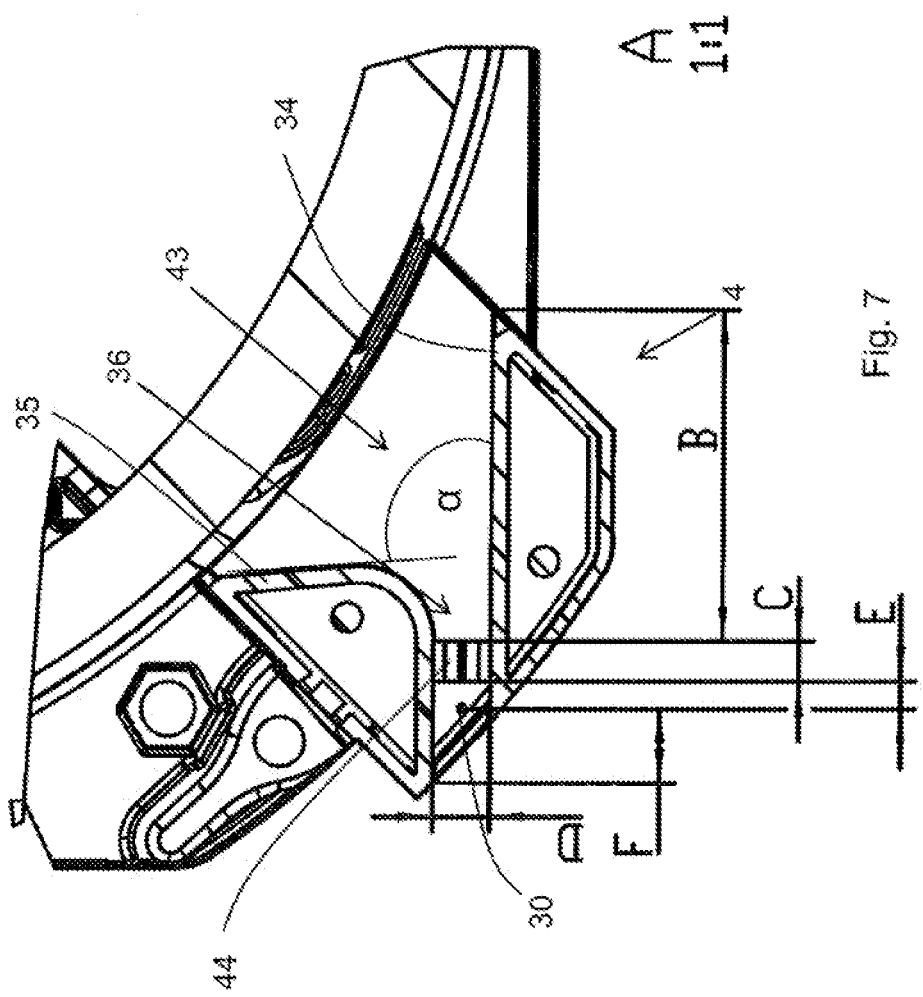
FIG. 7 shows a detail view A from FIG. 6b.

In reference to FIGS. 6a, 6b and 7, the housing portion 4 and the housing bypass formed therein are represented in greater detail. In FIG. 7, which is a detail view A of the cross-sectional view A-A from FIG. 6b, the closed shape of the webs 34, 35, which constitutes the nozzle channel 36, can be seen clearly. The web 35, which is exposed directly to the blowing of the impeller 5, extends substantially perpendicularly to the out-blow direction; at the blow-in opening 43, the web 35 forms a rounding as transition into the nozzle channel 36 of the housing bypass. The two webs 34, 35 lead the flow into the nozzle channel 36 and form the housing confusor, in which both the honeycomb rectifier 44 and also the measuring means 30 for the volume flow measurement are arranged. The honeycomb rectifier 44 covers the surface of the entire nozzle channel 36. The inflow-side opening angle α of the housing confusor, formed by the webs 34, 35, is 95° in the design shown.

The measuring means 30 are arranged at a distance E from the honeycomb rectifier 44, which corresponds to half the bypass width D. The intake distance B is determined by the length of the web 34 to the honeycomb rectifier 44 and, in the embodiment example shown, corresponds to four times the bypass width D. The discharge distance F is determined between the measuring means 30 and the outermost outlet site of the bypass flow at the edge of the web 35 and, in the embodiment example shown, corresponds to 1.5 times the bypass width D. The width C of the honeycomb rectifier 44 is preferably in a range of 0.7-1.0 of the bypass width D, and, in the embodiment shown, it is 0.8*D. The bypass width D corresponds to the width of the nozzle channel 36 extending in a straight line with constant width through webs 34, 35 extending in parallel in certain sections.

The invention claimed is:

1. A suction nozzle for a fan having a central rotational axis, with a suction opening for suctioning a fan main flow, wherein the suction nozzle comprises:
    an opening edge section which adjoins the suction opening and has at least one local outbreak,
    a flow insert detachably provided in the local outbreak of the opening edge section, wherein the flow insert forms a bypass leading to the suction opening for a bypass flow leading to the fan main flow, and
    measuring means provided in the bypass for the volume flow determination of the fan main flow,
    wherein the flow insert comprises a confusor provided in the bypass,
    wherein the confusor is formed by at least a first web and a second web, the first web and the second web circumferentially facing one another to form a nozzle channel in the bypass, wherein the nozzle channel has a circumferentially narrowest section, and
    wherein the measuring means are arranged in the circumferentially narrowest section of the nozzle channel.

2. The suction nozzle according to claim 1, wherein the flow insert has a shape which corresponds to a shape of the opening edge section adjoining the outbreak, so that the opening edge section is configured continuously with fastened flow insert.

3. The suction nozzle according to claim 1, wherein the confusor is configured so as to form a single piece on the flow insert.

4. The suction nozzle according to claim 1, wherein the flow insert comprises latching elements for the positionally fixed fastening of the measuring means in the nozzle channel.

5. The suction nozzle according to claim 1, wherein for the formation of the bypass, the flow insert comprises an axial inlet opening extending on a radial outer edge of the flow insert, and an axial outlet opening extending on a radial inner edge of the flow insert, so that the bypass flow is axially suctioned and can be returned axially into the fan main flow.

6. The suction nozzle according to claim 5, wherein in a section adjoining the suction opening, the flow insert comprises an intake section extending in an axial direction, which the axial outlet opening adjoins.

7. The suction nozzle according to claim 1, wherein the outbreak and the flow insert extend over 10-30% of a total circumference of the suction opening.

8. A fan comprising a suction nozzle according to claim 1 and a blow-out unit as well as, arranged between the suction nozzle and the blow-out unit, an impeller, wherein the suction nozzle and the blow-out unit are connected via fastening legs, and wherein, via the impeller, during operation, a fan main flow as well as a bypass flow through the bypass of the suction nozzle can be produced.

9. A blow-out unit of a fan having a central rotational axis, configured for accommodating an impeller, comprising:
a housing which, when used according to a predetermined purpose, adjoins the impeller in flow direction and can be exposed to the flow of a fan main flow, and which forms a housing bypass for a bypass flow of the fan main flow, and
measuring means provided in the housing bypass, for the volume flow determination of the fan main flow,
wherein the housing bypass comprises a housing confusor,
wherein the housing confusor is formed by at least a first web and a second web, the first web and the second web circumferentially facing one another to form a housing nozzle channel in the housing bypass, wherein the housing nozzle channel has a circumferentially narrowest section, and
wherein the measuring means are arranged in the circumferentially narrowest section of the housing nozzle channel.

10. The blow-out unit according to claim 9, wherein an inflow-side opening angle (a) of the housing confusor, which is formed by the webs, is 90-110°.

11. The blow-out unit according to claim 9, wherein within the housing bypass, upstream of the measuring means, a flow rectifier for the bypass flow is arranged for the volume flow determination.

12. The blow-out unit according to claim 11, wherein a distance (E) in flow direction between the flow rectifier and the measuring means in relation to a bypass width (D) in the area of the measuring means is set such that $0.5*D \leq E \leq 1.5*D$.

13. The blow-out unit according to claim 11, wherein the flow rectifier is a honeycomb rectifier.

14. The blow-out unit according to claim 9, wherein a discharge distance (F) between the measuring means and an outermost outlet site of the bypass flow in relation to a bypass width (D) in the area of the measuring means is set such that $1.5*D \leq F \leq 2*D$.

15. The blow-out unit according to claim 11, wherein a straight intake distance (B) of the bypass flow within the housing portion to the flow rectifier in relation to a bypass width (D) in the area of the measuring means is set such that $3*D \leq B \leq 5*D$.

16. The blow-out unit according to claim 9, wherein the housing portion is configured as a cable accommodation for a connection cable of the fan and the housing bypass is integrated in the cable accommodation.

17. A fan comprising a suction nozzle and a blow-out unit according to claim 9 as well as an impeller arranged between the suction nozzle and the blow-out unit, wherein the suction nozzle and the blow-out unit are connected via fastening legs, and wherein, via the impeller, during operation, a fan main flow as well as a bypass flow through the housing bypass of the of the housing portion of the blow-out unit can be produced.

* * * * *